(12) United States Patent
Mondal et al.

(10) Patent No.: US 12,506,417 B2
(45) Date of Patent: Dec. 23, 2025

(54) SECONDARY SIDE CONTROLLED FLYBACK CONVERTER WITH ACCURATE FEED-FORWARD SENSING

(71) Applicant: Cypress Semiconductor Corporation, San Jose, CA (US)

(72) Inventors: Partha Mondal, Paschim Medinipur (IN); Arun Khamesra, Bangalore (IN); Santosh Kulkarni, Dharwad (IN)

(73) Assignee: Cypress Semiconductor Corporation, San Jose, CA (US)

( * ) Notice: Subject to any disclaimer, the term of this patent is extended or adjusted under 35 U.S.C. 154(b) by 241 days.

(21) Appl. No.: 18/499,039

(22) Filed: Oct. 31, 2023

(65) Prior Publication Data

US 2024/0421717 A1    Dec. 19, 2024

Related U.S. Application Data

(60) Provisional application No. 63/521,824, filed on Jun. 19, 2023.

(51) Int. Cl.
*H02M 3/335* (2006.01)
(52) U.S. Cl.
CPC .............................. *H02M 3/33592* (2013.01)
(58) Field of Classification Search
CPC ................................................ H02M 3/33592
See application file for complete search history.

(56) References Cited

U.S. PATENT DOCUMENTS

| | | | | |
|---|---|---|---|---|
| 2020/0412266 A1* | 12/2020 | Mondal | ............ | H02M 3/33592 |
| 2021/0194376 A1* | 6/2021 | Lee | .......................... | H02M 1/32 |
| 2022/0200438 A1* | 6/2022 | Ahmed | .................... | H02M 7/21 |

OTHER PUBLICATIONS

"USB PD power adapter secondary side controller", Infineon Technologies AG, Jun. 16, 2022, 31 pages.
"TEA1999TK: GreenChip synchronous rectifier controller", NXP Semiconductors, Nov. 2017, 21 pages.
"Smartrectifiertm Control IC", International Rectifier, Nov. 6, 2013, 25 pages.

* cited by examiner

*Primary Examiner* — Adolf D Berhane
*Assistant Examiner* — Afework S Demisse

(57) ABSTRACT

A flyback-converter with synchronous-rectifier (SR) sense architecture is provided. A secondary side controller includes a SR-sense pin coupled through an external resistor to a drain of an SR on the secondary-side, a negative-sensing-detector, a peak-detector, a zero-crossing-detector, all coupled to the pin, and a resistor network (Rn) coupled between the pin and ground. The Rn includes a first resistor (R1) to couple the pin and to ground through a first switch (S1) during negative-sensing to divide a voltage ($V_{SR\_drain}$) coupled to the pin, and a second, higher resistance resistor (R2) to couple the pin to ground through a second switch (S2) during peak-detection to divide $V_{SR\_drain}$ coupled to the pin. S1 and S2 are controlled by register-transfer-level circuit in the SSC. A line-feed-forward (LFF) circuit is coupled to the pin through an active diode to receive an undivided $V_{SR\_drain}$ and mirrors diode current to control the converter in LFF mode.

20 Claims, 9 Drawing Sheets

SECONDARY SIDE CONTROLLED FLYBACK CONVERTER WITH ACCURATE FEED-FORWARD SENSING

CROSS-REFERENCE TO RELATED APPLICATIONS

This application is claims the benefit of priority under 35 U.S.C. 119(e) to U.S. Provisional Patent Application Ser. No. 63/521,824, filed Jun. 19, 2023, which is incorporated by reference herein in its entirety.

TECHNICAL FIELD

This disclosure relates generally to flyback converters, and more particularly to secondary side controlled flyback converters including synchronous-rectifier sense architecture with accurate feed-forward sensing.

BACKGROUND

Switch-mode power supplies (SMPSs) or converters are used to convert power from an alternating current (AC) source to a direct current (DC) output at a specified voltage level. One type of SMPS widely utilized in portable consumer, industrial and medical applications is a secondary-side-controlled (SSC) flyback converter. Referring to FIG. 1A, a secondary side controlled flyback converter 100 generally includes a secondary-side-controller (SSC 102), a transformer 104 having a primary-winding (NP) on a primary side 106 electrically connected or coupled to an AC input, and a secondary-winding (NS) on a secondary side 108 coupled to a DC output. The primary side 106 a includes a bridge rectifier 110, and one or more input filters 112 and 114, coupled to the transformer 104 to rectify an AC input voltage and supply input power to the primary-winding of the transformer 104, and a power switch (PS 116), such as a primary field effect transistor, having a drain coupled to the transformer, a gate coupled to a primary-startup-controller (PSC 118), and a source coupled to the PSC and, through a resistor (RCS) to ground. Generally, the PSC 118 is further coupled to the rectified AC input voltage to the transformer 104 through a resistor ($R_{IN}$).

The secondary side 108 of the flyback converter 100 includes, in addition to the SSC 102, an output capacitor 120 coupled across the secondary-winding of the transformer 104 to provide a DC output voltage, and a synchronous rectifier (SR 122), such as a synchronous rectifier field effect transistor (SR_FET), coupled between the transformer 104 and a ground terminal of the DC output. The SR 122 includes a drain node 122a coupled to the transformer 104 and to the SSC 102 through a voltage-divider 124 including an external resistor (Rext) and an internal resistor (Rint) to sense a voltage on the SR_drain; a gate node 122b coupled to the SSC to drive the SR; and a source node 122c coupled to the SSC and the ground terminal of the DC output.

The SSC 102 further includes a negative-sensing (NSN) circuit 126 to turn on the SR 122 when SR_drain voltage drops below zero volts, a zero-crossing detector (ZCD) circuit 128 to turn off the SR when SR_drain voltage rises above zero volts, a peak-detector (PKD) circuit 130 to enable Valley switching of the PS 116, and a voltage-to-current (V2I) circuit 132 is used to enable indirect peak-current mode using feed-forward current for PWM ramp generation and line-in voltage detection to optimize the efficiency of the flyback converter when using valley or PWM pulse-width switching.

FIG. 1B graphically illustrates primary current (I_primary) and secondary current (I_secondary), and a resulting a SR_drain voltage for the flyback converter of FIG. 1A.

Problems with the above described conventional flyback converter 100 include that because of the transformer's typically low primary to secondary turns-ratio (3:1), SR_drain 122a can go as high as 150V for $V_{BUS}$ of 28V, requiring a Rext with a high resistance to limit voltage on a SR_SEN pin to eliminate the need of high-voltage technology inside the SSC 102. This higher Rext results in slow detection of NSN and slower turn on of the SR resulting in reduced efficiency due to power loss. Conversely, a lower resistance Rext results in higher DC current for low loads ($V_{BUS}$/Rext), and fails to meet government mandated and industry standards. Additionally, the voltage-divider 124 can result in inaccurate Feed-forward sensing due to non-tracking of internal and external resistance, and the removal of $V_{BUS}$ component from the resistance divided SR_drain voltage. Finally, the use of the voltage-divider 124 requires a complicated and costly line feed-forward (LFF) circuit to extract feed-forward information from the resistance divided SR_drain voltage.

Accordingly, there is a need for a second side controlled flyback converter capable of reliably and accurately providing NSN, ZCD, PKD and feed-forward sensing. It is further desirable that the flyback converter architecture have a reduced complexity, without the need for additional circuits external to the SSC, and have a low-power architecture capable of minimizing current loss through the SSC in low-power, feed-forward operation.

SUMMARY

A secondary-side-controlled AC-DC or flyback converter with a synchronous-rectifier (SR) sense architecture and method of operating the same for accurate feed-forward sensing are provided. In an embodiment, the flyback converter includes a secondary-side-controller (SSC) including a SR sense (SR_SEN) pin coupled through an external resistor (Rext) to a drain (SR_drain) of a synchronous rectifier (SR) on a secondary-side of the flyback converter, a negative-sensing-detector (NSN), a peak-detector (PKD), and a zero-crossing-detector (ZCD) coupled to the SR_SEN pin, and a resistor network (Rn) coupled between the SR_SEN pin and ground. The Rn includes a first resistor (R1) coupled to the SR_SEN pin and through a first switch (S1) to ground, the first switch controlled by a control negative sense (CTRLN) signal from an register transfer level (RTL) circuit in the SSC, the first switch operable to couple the R1 to ground based on an expected time of an NSN event to divide a SR_drain voltage ($V_{SR\_drain}$) coupled to the SR_SEN pin, and a second resistor (R2) having a resistance greater than the R1 coupled to the SR_SEN pin and through a second switch (S2) to ground, the second switch controlled by a control peak sense (CTRLP) signal from the RTL circuit, the second switch operable to couple the R2 to ground during peak detection to divide the $V_{SR\_drain}$ coupled to the SR_SEN pin, and to decouple the R2 after a pre-defined number of peaks have been detected.

Generally, the SSC further includes a line-feed-forward (LFF) circuit coupled to SR_SEN through an active diode or active diode circuit, and the RTL circuit is operable to remove the CTRLN signal and CTRLP signal from S1 and S2 to decouple R1 and R2 from ground so that an undivided $V_{SR\_drain}$ is coupled through Rext to a voltage ($V_{SR\_SEN}$) on the SR_SEN pin during a feed-forward sensing mode of the flyback converter. A current ($I_D$) through the active diode is mirrored by the LFF circuit and used to generate a feed-forward current (I_feedfwd) for feed-forward sensing. In some embodiments the LFF circuit further includes circuits and elements to: multiply the Ip sensed by a turns-ratio (N) of a transformer in the flyback converter, to generate I_feedfwd that is independent of the transformer's turns-ratio; a sample and hold (S/H) circuit to sample and hold the sensed and multiplied $I_D$; a compensation current source to compensate for a voltage ($V_D$) dropped across the diode; a number of current references to a number of predefined current references and to detect over or under voltage conditions of $V_{IN}$; and an internal clamping circuit to clamp I_feedfwd to provide a minimum I_feedfwd current for $V_{IN}$ lower than 80V.

Generally, the active diode or active diode circuit is operable to remove from $V_{SR\_SEN}$ on the SR_SEN pin a component of $V_{SR\_drain}$ arising from an output bus voltage ($V_{BUS}$) on an output of the flyback converter. In one embodiment the active diode or active diode circuit is further operable to clamp the SR_SEN pin to $V_{BUS}$ when R1 and R2 are decoupled from ground to eliminate the need of high-voltage technology inside the SSC.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

DETAILED DESCRIPTION

Figure 1A:
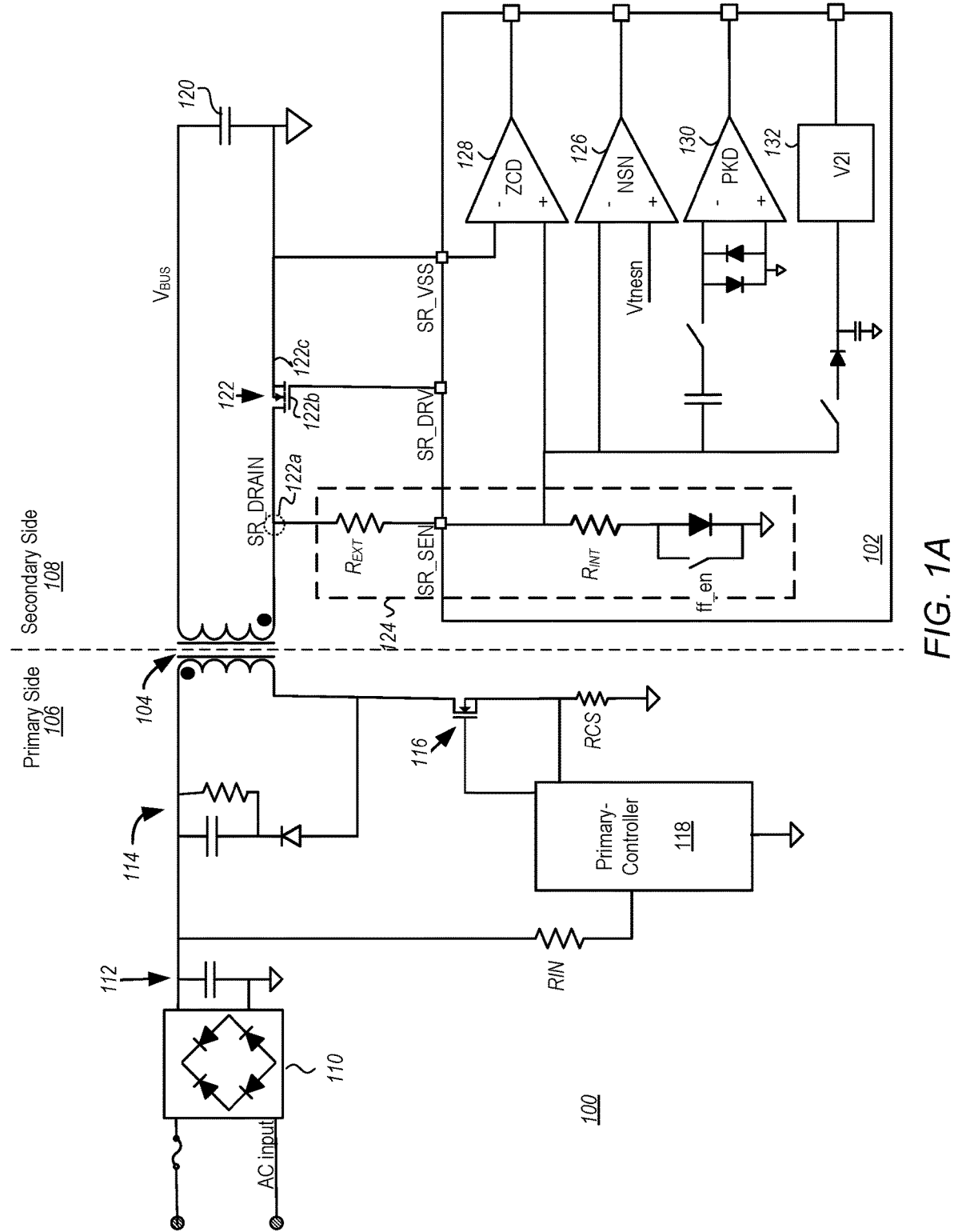
FIG. 1A is a schematic block diagram illustrating a conventional secondary-side-controlled flyback converter.
Figure 1B:
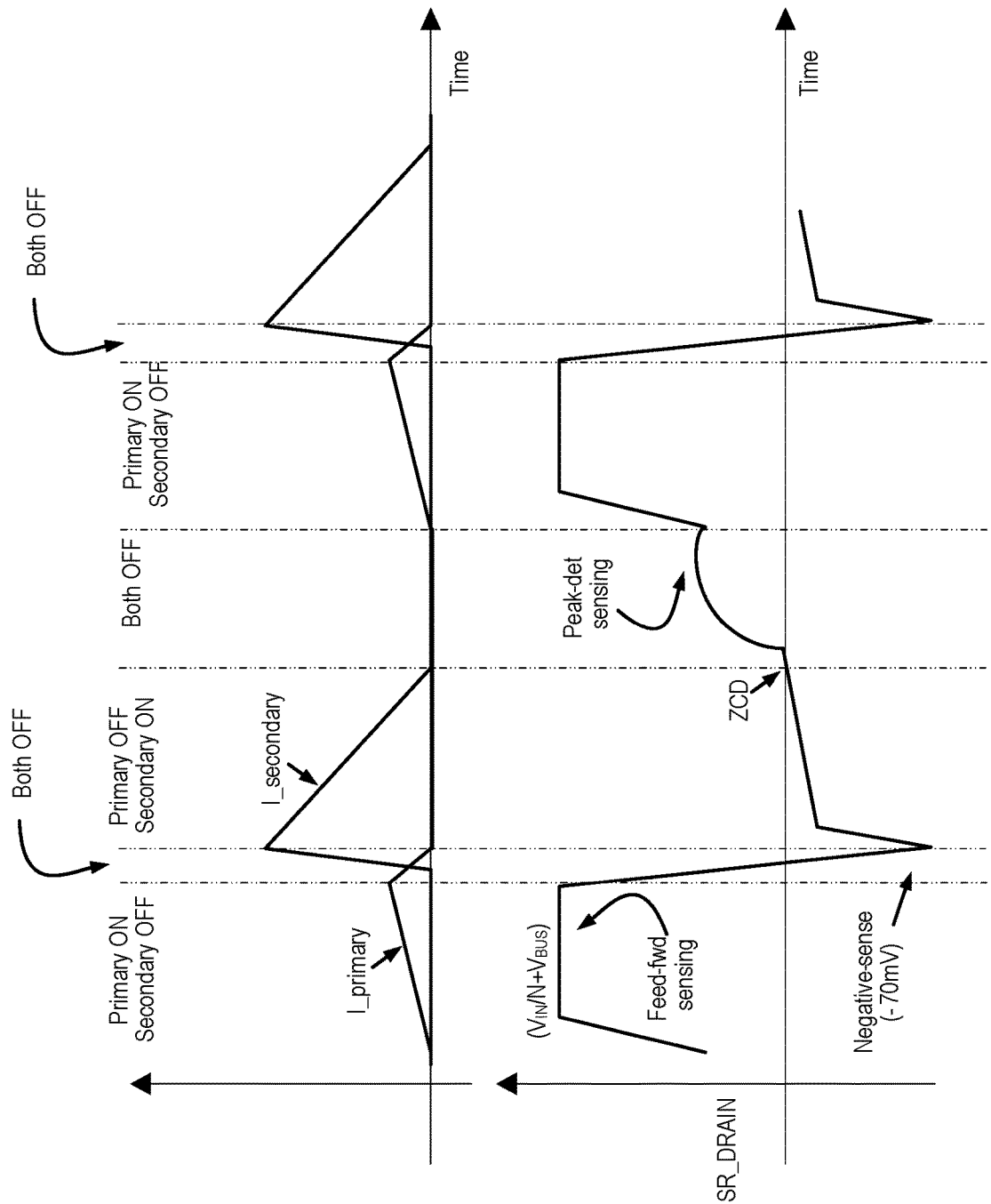
FIG. 1B graphically illustrates primary current (I_primary) and secondary current (I_secondary), and a resulting synchronous rectifier (SR) drain voltage for the flyback converter of FIG. 1A.

A secondary-side-controlled AC-DC or flyback converter including synchronous-rectifier (SR) sense architecture with accurate feed-forward and method of operating the same are provided. The flyback converter and method are capable of accurately sensing on a primary an input-line voltage ($V_{IN}$) from a voltage ($V_{SR\_DRAIN}$) on a drain of the SR (SR_drain) without the need for additional external circuitry outside a secondary-side-controller (SSC), or receiving information or signals from a primary-side-controller (PSC). Preferably, the SSC is implemented using standard complementary metal-oxide-semiconductor (CMOS) technology, without the need for high voltage (HV) components of 150V or 200V tolerant technology to sense SR_drain node voltage directly in the chip. More preferably, the SSC includes a low cost active diode or circuit implemented using drain-extended P-type field-effect-transistors (DEPFET) with dynamic bulk switching to provide an active diode with HV tolerant source and drain with tolerant voltage ranging from 20V to 42V using standard 5V CMOS technology.

Briefly, the architecture of the flyback converter described herein enable accurate information on $V_{IN}$ to be extracted from the voltage ($V_{SR\_DRAIN}$) on the SR_drain by cancelling a secondary bus voltage ($V_{BUS}$) component in the $V_{SR\_DRAIN}$, without the need for additional, or external circuitry for cancellation of $V_{BUS}$ component of the voltage ($V_{SR\_DRAIN}$) on the SR_drain, during low-power, feed-forward modes of operation. Additionally, the flyback converter described herein provides improved efficiency in feed-forward operation, by turning off or disabling a voltage-divider through which the SSC is coupled to the SR_DRAIN to reduce current through the voltage-divider and SSC during feed-forward operation, thereby lowering power consumption under low-load conditions.

The SSC Flyback converter and methods will now be described in greater detail with reference to FIGS. 2A through 4. In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to couple as used herein may include both to directly electrically connect two or more components or elements and to indirectly connect through one or more intervening components.

Figure 2A:
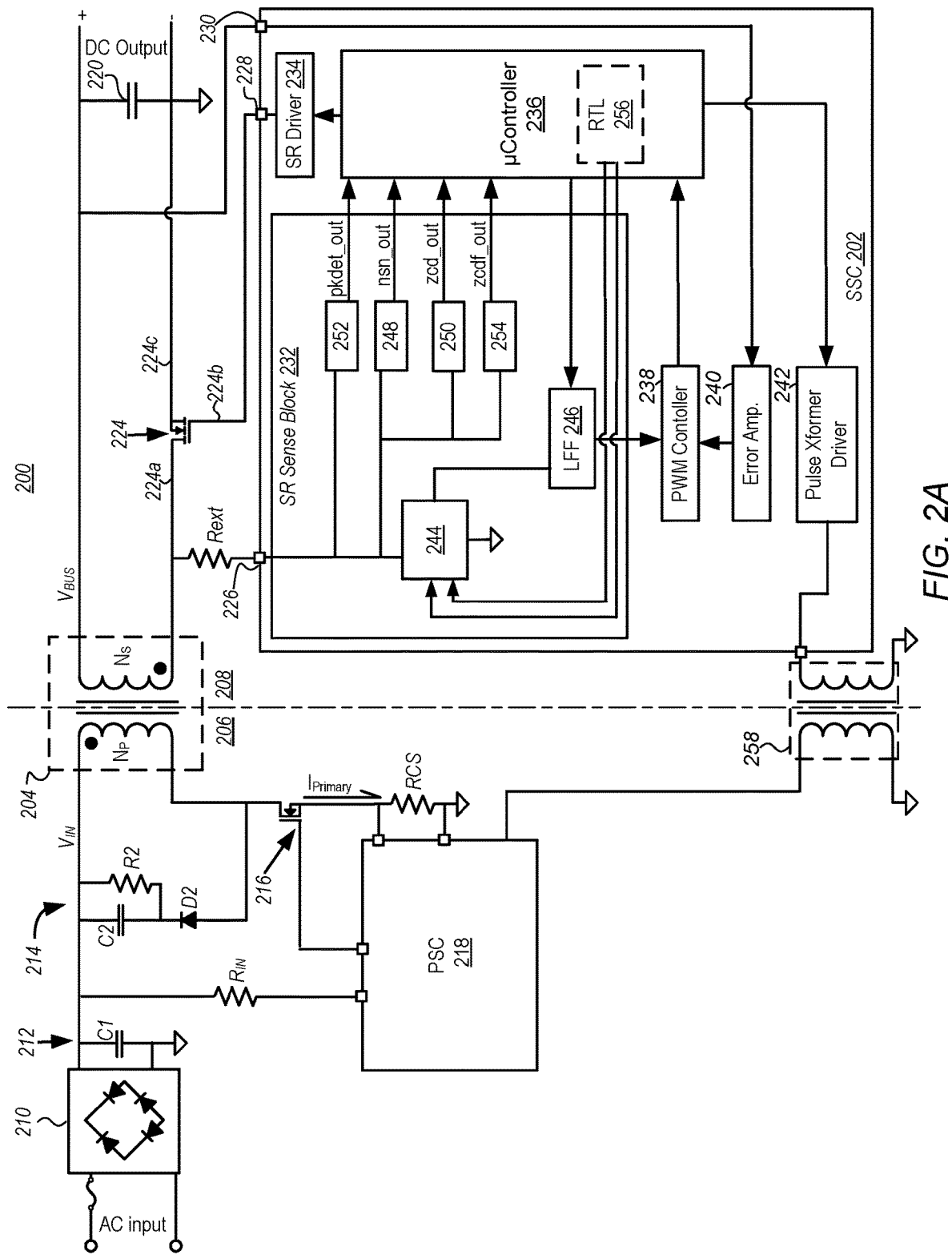
FIG. 2A is a schematic block diagram illustrating a SSC flyback converter with a secondary side controller (SSC) and SR architecture for accurate feed-forward sensing in accordance with techniques and embodiments described herein.

FIG. 2A is a schematic block diagram illustrating a secondary-side-controlled flyback converter 200 with a synchronous rectifier (SR) architecture operable to accurately sense an input-line voltage ($V_{IN}$) from a voltage ($V_{SR\_DRAIN}$) on a drain of a synchronous rectifier (SR) on the secondary side without the need for additional, or external circuitry outside a secondary-side-controller (SSC 202).

Referring to FIG. 2A the flyback converter 200 generally includes, in addition to the SSC 202, a transformer 204 with a primary-winding having a first number of turns ($N_P$) on a primary side 206 of the flyback converter and electrically connected or coupled to an AC input voltage, and a secondary-winding on a secondary side 208 having a second number of turns ($N_S$) electrically coupled to a DC output. Typically, the transformer 204 is a step down transformer wherein the number of turns ($N_P$) on the primary side 206 greater than the number of turns ($N_S$) on the secondary side 208, for example 3:1.

On the primary side 206 the flyback converter 200 generally includes a rectifying circuit, such as a bridge rectifier 210, and one or more input filters coupled to a first terminal of the transformer 204 rectify the AC input voltage and to supply input power to the primary-winding of the transformer 204. The input filters can include a first input filter 212 consisting of a capacitor (C1) coupled to or across an output of the rectifier 210, and a snubber 214 including a capacitor (C2) and a resistor (R2) coupled in parallel between the first terminal of the transformer 204 and a cathode of a diode or rectifier (D2), the diode D2 having an anode coupled to a second terminal on the primary side 206 of the transformer.

The flyback converter 200 further includes on the primary side 206 a power switch (PS 216), such as a primary field effect transistor (PR_FET), having a drain node coupled to the second terminal of the transformer 204, a gate node coupled to a primary-side or primary start-up controller (PSC 218), and a third or source node coupled both to the PSC and, through a current sensing element such as a resistor (RCS), to an electrical ground, and is operable to sense a primary side current (I_primary) flowing through the primary-winding when the PS 216 is turned on or conducting. Generally, as in the embodiment shown, the PSC 218 is further coupled to the first terminal of the transformer 204 through a resistor ($R_{IN}$) to receive a voltage or signal equal or proportional to the rectified AC input voltage, and to power the PSC during start-up.

On the secondary side 208 the flyback converter 200 includes an output capacitor 220 coupled between a third terminal of the transformer 204 and an electrical ground or ground terminal to provide a DC output voltage to an output of the flyback converter. The flyback converter 200 further includes on the secondary side 208 a synchronous rectifier (SR 224), such as a synchronous rectifier field effect transistor (SR_FET), coupled between a fourth terminal of the transformer 204 and the ground terminal of the DC output. The SR 224 includes a drain node (SR_drain 224a) coupled to the transformer 204 and to a single SR_SEN pin 226 of the SSC 202 through an external resistor (Rext) to sense a voltage ($V_{SR\_Drain}$) on the drain of the SR; a gate node 224b coupled to the SSC to drive or control the SR; and a source node 224c coupled to the ground terminal of the DC output. The SSC 202 is further coupled to the gate node 224b of the SR 224 through a SR-drive pin 228, and to a secondary bus voltage ($V_{BUS}$) through a $V_{BUS}$ pin 230. In some embodiments, such as that shown, the SSC 202 is realized or implemented as single integrated circuit (IC), or as a number of ICs packaged in a single IC package.

The capacitor (C2) in the snubber 214 and the primary-winding of the transformer 204 form an inductor-capacitor (LC) circuit, which generates an LC resonance ringing and a corresponding sinusoidal oscillation in the voltage ($V_{SR\_Drain}$) on the SR_drain 224a. The frequency of this LC resonance can be determined either by calibration at an initial power up of the flyback converter 200, or by calculations performed by a system designer, and is used to determine a reference or desired pulse width of a pulse width modulated (PWM) signal communicated from the SSC 202 to the PSC 218 and used to control the PS 216.

The SSC 202 generally includes a SR_sense block 232 to sense $V_{SR\_DRAIN}$, a SR driver 234 to drive the SR 224, a microcontroller 236, a PWM controller 238, an error amplifier 240 and a pulse transformer driver 242. The SR_sense block 232, described in greater detail below, generally includes a clamp and resistor network 244 through which a line-feed-forward block or circuit (LFF circuit 246) is coupled to the SR_SEN pin 226, and a number of voltage-detecting circuits or blocks (collectively 248-252) coupled between the SR_SEN pin and the microcontroller 236. As shown in FIG. 2A, the number of voltage-detecting blocks generally includes a negative-sensing (NSN) block 248 configured to detect when the $V_{SR\_Drain}$ is going from a positive to a negative voltage, a first zero-crossing detector (ZCD) block 250 configured to detect when zero voltage is sensed on the SR_SEN pin 226 following NSN detection or an NSN event during the $V_{SR\_Drain}$ is going from a negative to a positive voltage, a peak-detector (PKD) block 252 configured to detect a positive peak on the secondary corresponding to a valley on the drain of Primary FET (PS 216), and a second zero-crossing detector (ZCDF) block 254 configured to detect when voltage on the SR_SEN pin rises above zero voltage after SR_FET 224 is turned-off based on first ZCD detection.

The microcontroller 236 generally includes a microprocessor and memory to control operation of components and circuits of the SSC 202, and a register transfer level (RTL 256) to provide control signals to operate the clamp and resistor network 244.

The error amplifier 240 is coupled to the secondary bus voltage ($V_{BUS}$) through the $V_{BUS}$ pin 230 and is configured or operable to output to the PWM controller 238 an error signal proportional to a difference between $V_{BUS}$ and a desired or programmed voltage. The PWM controller 238 receives a signal from the LFF circuit 246 proportional to the input-line voltage ($V_{IN}$) as sensed through the SR_SEN pin 226, and generates a PWM ramp or sawtooth signal, which is compared with the output of the error amplifier 240 to determine a pulse width of the PWM signal used by the microcontroller 236 to turn on and off the PS 216 through the PSC 218. The pulse transformer driver 242 receives the PWM signal from the microcontroller 236 and drives a pulse transformer 258 to provide the PWM signal to the PSC 218.

Figure 2B:
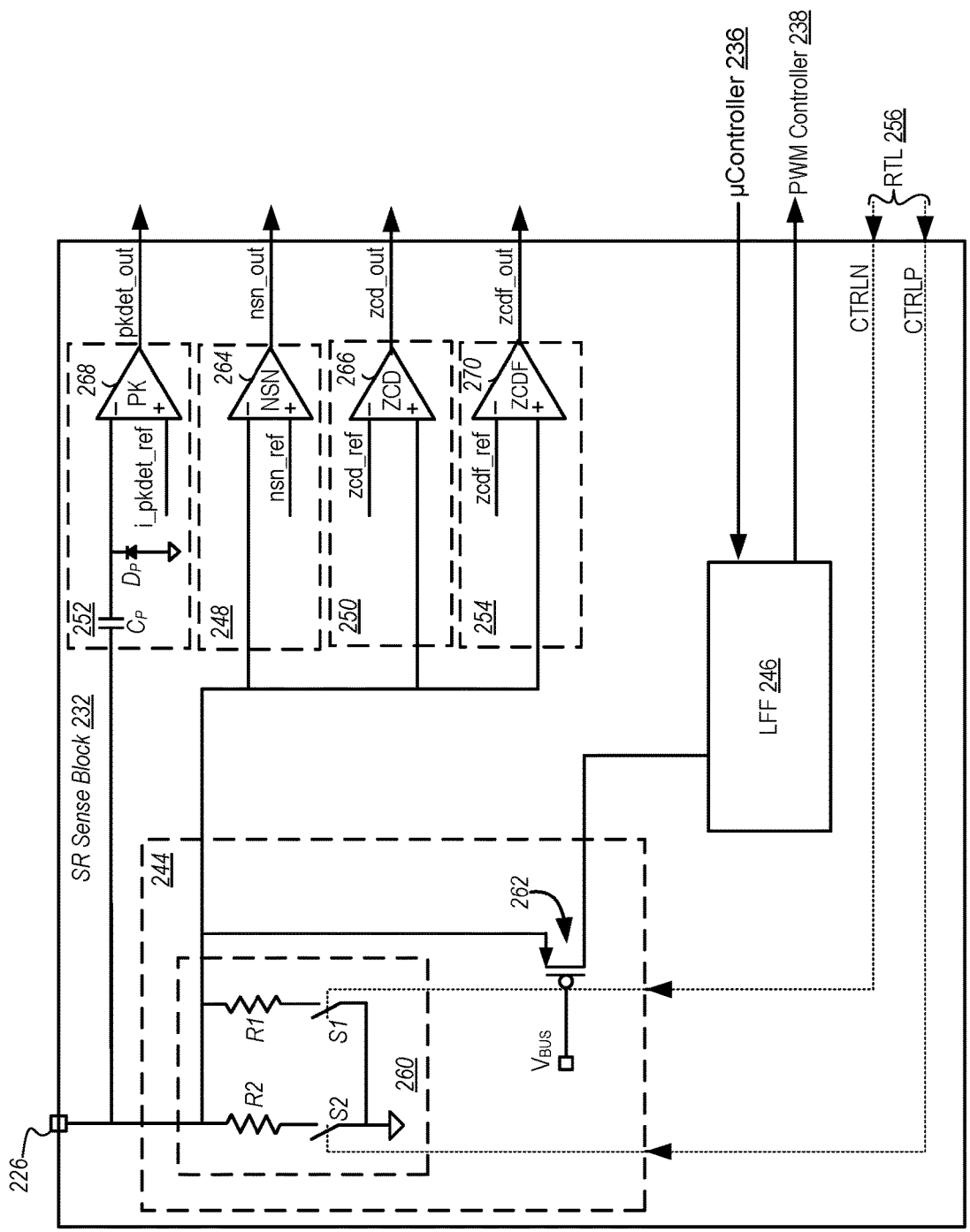
FIG. 2B is a schematic block diagram illustrating an embodiment of a SR_Sense block in the SSC of the flyback converter of FIG. 2A in accordance with the present disclosure.

FIG. 2B is a detailed schematic block diagram illustrating an embodiment of the SR_sense block 232 in the SSC 202 of the flyback converter of FIG. 2A. Referring to FIG. 2B the clamp and resistor network 244 includes an internal resistor network 260 coupled between the SR_SEN pin 226 and ground, which together with the external resistor Rext (not shown in this figure) form a voltage-divider, used in some modes of operation to couple a divided or reduced voltage from the SR_drain 224a through the SR_SEN pin 226 and to the voltage-detecting blocks 248-252. In the embodiment shown, the internal resistor network 260 includes at least a first internal resistor ($R_1$) coupled to the SR_SEN pin 226 and through a first switch (S1) to ground, and a second internal resistor ($R_2$) having a resistance greater than the $R_1$ coupled to the SR_SEN pin and through a second switch (S2) to ground.

The first switch S1 is controlled by a CTRLN signal from the RTL 256 in the microcontroller 236 (not shown in this figure), and is operable to couple the R1 to ground based on an expected time of a NSN event. The lower resistance of R1, for example about 250Ω, enables faster detection of the NSN event, while allowing use of an Rext with a larger resistance than in conventional flyback converters, for example about 12 kΩ to 20 kΩ as compared to 5 kΩ in the flyback converter 100 shown in FIG. 1A, thereby limiting current losses for low-loads during feed-forward operation.

The second switch S2 is controlled by a CTRLP signal from the RTL 256, and is operable to couple the $R_2$ to ground during zero crossing and peak detection, and to disable or decouple the $R_2$ after a pre-defined number of peaks. Suitable values for the resistance $R_2$ include, for example, about 4 kΩ.

The first switch S1 and second switch S2 are usually open during feed-forward operation. To prevent the SR_SEN pin 226 from reaching voltages equal to or greater than $V_{BUS}$ or about 150V during feed-forward operation when switches S1 and S2 are open, the clamp and resistor network 244 further includes an internal active clamp, shown in FIG. 2B as an p-type metal-oxide-silicon (PMOS) diode 262, to internally clamp the SR_SEN pin 226 to $V_{BUS}$. thereby avoiding the need for using high voltage (HV) tolerant 150V technology in circuits and components of the SSC 202, including in the LFF circuit 246.

As noted previously, the voltage-detecting blocks generally include the NSN block 248, the first ZCD block 250, the PKD block 252, and the second zero-crossing detector or ZCDF block 254.

The NSN block 248 includes a comparator 264 having a first, inverting input coupled to the SR_SEN pin 226 through the voltage-divider formed by the external resistor Rext and the internal resistor network 260, and a second, non-inverting input coupled to a negative reference voltage (nsn_ref). Generally, this reference voltage nsn_ref can be any desired voltage −700 millivolts (mV) to +200 mV at which the SSC 202 is operable to turn on the SR 224 when an NSN event is detected. During the NSN detection phase when the $V_{SR\_DRAIN}$ is going from a positive to a negative voltage, switch S1 is closed by the CTRLN signal from the RTL 256 in the microcontroller 236, enabling the voltage-divider formed by the external resistor Rext and resistor R1 of the internal resistor network 260 to substantially reduce the voltage on the SR_SEN pin 226 while enabling faster detection of the NSN event. The CTRLN signal is provided or generated by the RTL 256 in the microcontroller 236 and is present for a fixed time based on an expected time of the NSN event. The relatively low resistance of resistor R1, as compared to voltage-dividers in previous SSC flyback converters, provides a larger portion of the $V_{SR\_DRAIN}$ on the SR_SEN pin 226 and at the inverting input of the NSN comparator 264. The NSN comparator 264 generates a negative voltage signal (nsn_out), which is coupled to the microcontroller 236 to turn on the SR 224.

The first ZCD block 250 can also include a comparator 266 having a first, non-inverting input coupled to the SR_SEN pin 226, and a second, inverting input coupled to a ZCD reference voltage (ZCD_ref). During a ZCD detection phase the PS 216 is off and the SR 224 is on, the voltage $V_{SR\_DRAIN}$) on the SR_drain 224a is at a negative voltage, rising slowly towards 0V. The comparator 266 of the ZCD block 250 is operable to generate a zero current signal (zcd_out), which is coupled to the microcontroller to turn off the SR 224 when 0V is sensed on the SR_SEN pin 226. During the ZCD detection phase the CTRLN and the CTRLP signal remain low, so that both switches S1 and S2 remain open, resulting in no voltage division of the $V_{SR\_DRAIN}$ at the SR_SEN pin 226. The absence of voltage division causes the full voltage ($V_{SR\_DRAIN}$) to be present on the SR_SEN pin 226, enabling a rapid and precise detection of the zero voltage crossing of the $V_{SR\_DRAIN}$ on the SR_drain 224a, resulting in rapid and precise switching off of the SR 224, which improves efficiency of the flyback converter 200.

As noted previously, when the SR 224 turns off, and as PS 216 has not yet turned on, the capacitor (C2) in the snubber 214 and the primary-winding of the transformer 204 form an inductor-capacitor (LC) circuit, which generates sinusoidal oscillations or ringing on the drain of the PS, as well as inverted sinusoidal oscillations on the SR_drain 224a. To improve efficiency of the of the flyback converter 200, it is desirable that PS 216 when next turned on is turned on when there is a minimum sinusoidal voltage or valley in these sinusoidal oscillations on the PS drain, which corresponds to a maximum sinusoidal voltage of peak on the secondary SR_drain 224a.

The PKD block 252 is operable to sense this peak on the secondary side. The PKD block 252 can also include a comparator 268 having a first, inverting input coupled to the SR_SEN pin 226 through a capacitor Cp, and a second, non-inverting input coupled to a peak current detection reference (i_pkdet_ref). Generally, as in the embodiment shown the PKD block 252 further includes a diode Dp connected between the first, inverting input and ground to discharge the capacitor Cp. During peak detection immediately following the ZCDF detection, the second switch S2 controlled by the CTRLP signal from the RTL circuit 256 turns on coupling the second resistor R2 to ground during peak detection, dividing the portion of the $V_{SR\_DRAIN}$ present on the SR_SEN pin 226. The CTRLP signal is disabled or removed after a pre-defined number of peaks, for example 4 to 8, have been detected switch S2 is turned off or open, causing the voltage division to cease and allowing the full $V_{SR\_DRAIN}$ to be present on the SR_SEN pin 226 when $V_{SR\_DRAIN}$ below VBUS and internally clamp the SR_SEN pin 226 to $V_{BUS}$ when $V_{SR\_DRAIN}$ goes above VBUS during $V_{SR\_DRAIN}$ sinusoidal oscillations in peak detection mode. The microcontroller 236 then moves to a time-based (peak-to-peak delay) mode of operation and turns on PS 216 after a predetermined number of peak-to-peak delays.

The second zero crossing detector, ZCDF block 254, also includes a comparator 270 having a first, non-inverting input coupled to the SR_SEN pin 226, and a second, inverting input coupled to a ZCDF reference voltage (zcdf_ref). Once the SR_FET 224 is turned-off based on the first ZCD, there could be some residual current flowing through the SR_FET allowing $V_{SR\_DRAIN}$ voltage go back to a negative voltage again and the negative voltage can be as low as −0.7V. The second zero crossing detected by the ZCDF block 254 is used to make sure that $V_{SR\_DRAIN}$ voltage is above a zero voltage after SR_FET is completely turned-off. After ZCDF detection, the PKD block 252 is turned-on.

As noted previously both switch S1 and S2 are turned off or open during feed-forward operations, in which the PS 216 is on, SR 224 is off, and power is being stored in the magnetic field of the transformer 204. As shown in FIG. 2B the LFF circuit 246 is coupled to the SR_SEN pin 226 through the PMOS diode 262 in the clamp and resistor network 244. The gate node of the PMOS diode 262 is coupled $V_{BUS}$ to internally clamp the SR_SEN pin 226 to $V_{BUS}$, thereby avoiding the need for using HV tolerant 150V technology in the LFF circuit 246. Additionally, the PMOS diode 262 enables the LFF circuit 246 to directly sense a feed-forward current during feed-forward operations by subtracting the $V_{BUS}$ component from the voltage ($V_{SR\_DRAIN}$) sensed on the SR_drain 224a, prior to coupling the voltage ($V_{SR\_DRAIN}$–$V_{BUS}$) to the LFF circuit.

Figure 2C:
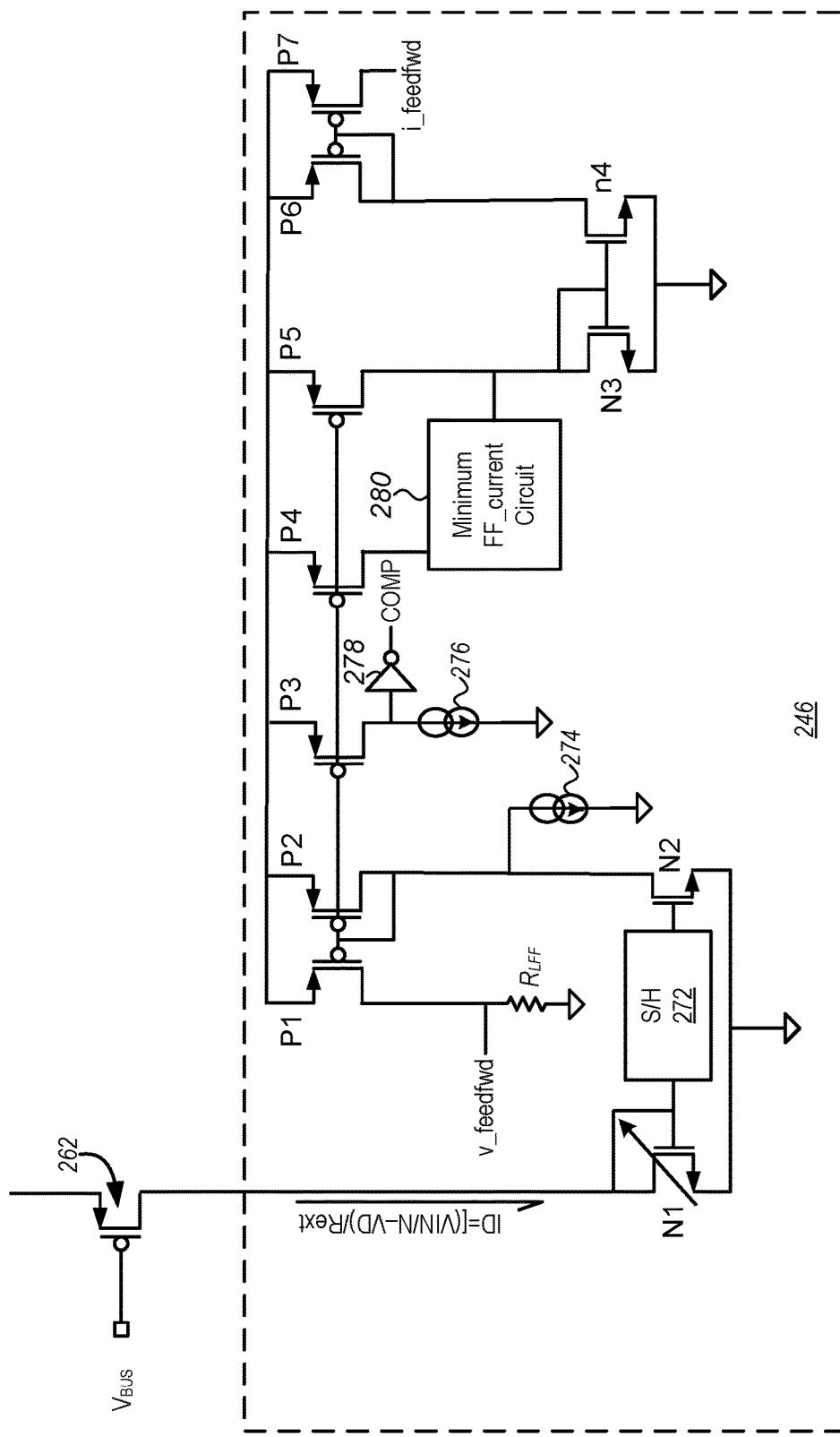
FIG. 2C is a schematic block diagram illustrating an embodiment of a line feed-forward (LFF) circuit in the SR_Sense block of FIG. 2B in accordance with the present disclosure.

The LFF circuit 246 will now be described in greater detail with reference to FIG. 2C. FIG. 2C is a schematic block diagram illustrating an embodiment of the LFF circuit 246 in the SR_sense block 232 of the SSC 202 of FIG. 2B.

Referring to FIG. 2C, the LFF circuit 246 senses a current ($I_D$) through PMOS diode 262 by directly mirroring it. An NFET multiplier (N1) in the LFF circuit 246 is adjusted or selected by a designer using firmware (FW) in the microcontroller 236 based on the turns-ratio (N) of the transformer 204 to generate a feed-forward current (I_feedfwd) and voltage (V_feedfwd) which are independent of transformer's turns-ratio.

The current ($I_D$) through PMOS diode 262 is proportional to:

$$(V_{SR\_DRAIN} - V_{BUS} - V_D)/Rext$$

where $V_{SR\_DRAIN}$ is the voltage on the drain of the SR 224 sensed through SR_SEN pin 226, $V_D$ is the voltage drop across PMOS diode 262, and Rext is the resistance of the external resistor Rext, and which is equivalent to:

$$(V_{IN}/N - V_D)/Rext$$

where $V_{IN}$ is the line-in voltage and N is the turn's ratio of the transformer 204.

It is noted that the LFF circuit 246 of FIG. 2C eliminates the need for a high Bandwidth voltage-to-current (V2I) circuit as well as any additional circuit for $V_{BUS}$ component subtraction, commonly used in SSC of conventional flyback converters. It is further noted that the feed-forward current (I_feedfwd) is independent of internal resistances of the SSC 202, and any variation resistances.

The LFF circuit 246 generally further includes a sample and hold (S/H) circuit 272 to store PMOS diode current ($I_D$), when the flyback converter 200 is operating in feed-forward mode, i.e., where the PS 216 in the primary is off, and the voltage on the drain of the SR 224 ($V_{SR\_DRAIN}$) does not reflect line-in voltage ($V_{IN}$). A second (N2) having a gate node coupled to the S/H circuit 272 mirrors or reproduces the current through the NFET multiplier (N1) when the sample was taken. A compensation current $I_{COMP}$ from a first current source 274 is then added to the generated feed-forward current (I_feedfwd) to compensate for the voltage drop ($V_D$) across the PMOS diode 262 to provide a more accurate, compensated feed-forward current. Generally, the compensation current $I_{COMP}$ is equal to a voltage dropped across the PMOS diode 262 divided by the resistance of the external resistor Rext.

A first current mirror formed by transistors P1 and P2 mirrors this current through a resistor $R_{LFF}$ coupled between a drain of transistor P1 and ground to generate a feed-forward voltage (V_feedfwd). The feed-forward current (I_feedfwd) through transistor P2 is compared against pre-defined reference current (Iref) of, for example, about 2.4 µA from a second current source 276 passed through transistor P3 to detect an over-voltage or under-voltage condition of $V_{IN}$. The results of this comparison are coupled to the microcontroller 236 through an inverter 278.

The feed-forward current (I_feedfwd) is further mirrored through transistor P4 and P5 where, if necessary the final feed-forward current (I_feedfwd) is clamped to a pre-defined minimum feed-forward current value (Minimum FF_current) by a minimum FF_current circuit 280, to provide the pre-defined minimum FF_current for $V_{IN}$ lower than abut 80V or any pre-defined low-line-in voltage on primary side. The current through P4 is compared with the pre-defined minimum FF_current in minimum feed-forward current circuit 280. If the current through P4 is less than the pre-defined minimum FF_current, then a differential current of (Iff_min–Ip4) is added to the current out of a drain of P5 (Ip5_out). The summation current of Ip5_out and the pre-defined minimum FF_current from the minimum feed-forward current circuit 280 is then mirrored using transistors N3, N4, P6 and P7 to provide a final feedfwd current. If current through P4 is already higher than the pre-defined minimum FF_current, the minimum feed-forward current circuit 280 does not add or subtract any additional current to the current mirrored through N3, N4, P6 and P7, and the final feedfwd current is directly proportional to primary side line in voltage ($V_{IN}$).

Figure 2D:
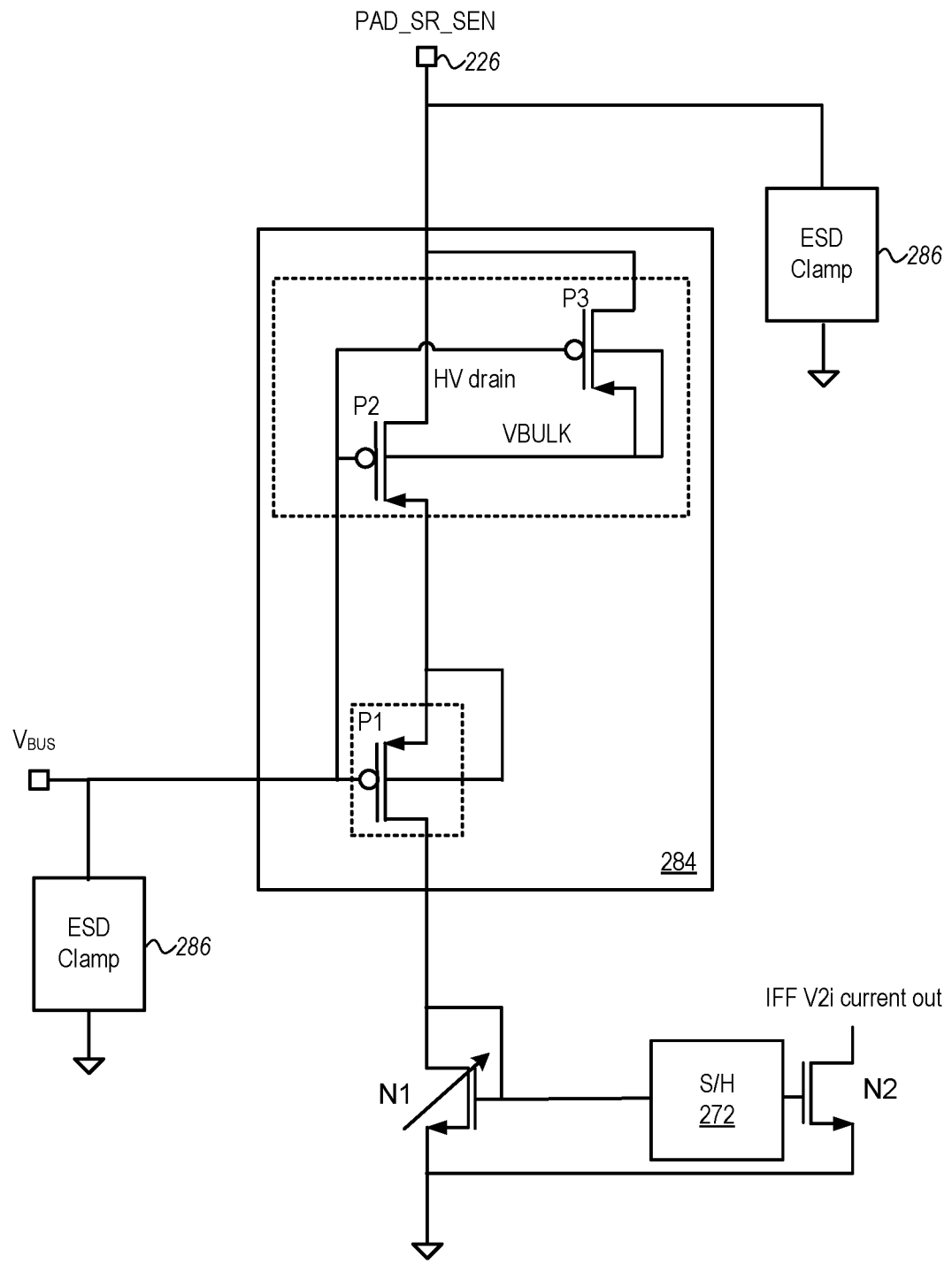
FIG. 2D is a schematic block diagram depicting an embodiment of an internal, active diode used in the SR_sense block of FIG. 2B to couple the LFF circuit to a SR sense (SR_SEN) pin, and to clamp the SR_SEN pin to a secondary bus voltage ($V_{BUS}$)

FIG. 2D is a schematic block diagram depicting another embodiment of an active clamping circuit or clamp 284 which can be used in place of PMOS diode 262 to couple the LFF circuit 246 to the SR_SEN pin 226, and to clamp SR_SEN pin to $V_{BUS}$. Briefly, in this alternative embodiment a single 20V or 40V HV PMOS is replaced by low cost DEPFETs based circuit solution.

Referring to FIG. 2D it is noted that the active clamp 284 is implemented using a number of drain extended p-type field effect transistors (DEPFETs), which support high voltage tolerance on a drain side only, and include a first pair of series connected DEPFETs, P1 and P2, coupled at source terminals, and operated using dynamic bulk switching provided by a third PFET, P3, to enable both a source and drain terminal of the active clamp 284 to be HV tolerant using standard, low cost CMOS technology. Furthermore, it is noted that because the active clamp 284 does not include a parasitic bipolar junction (BJT) current, common in single device clamping circuits, all current passes through the active clamp 284, thereby eliminating a risk of latch-up in the active clamp.

Additionally, as shown schematically in FIG. 2D the SSC 202 can further include a number of electrostatic-discharge (ESD) clamps 286 coupled to the SR_SEN pin 226 and $V_{BUS}$ pin 230 to protect the SSC and the active clamp 284 from damage due to transient electrostatic voltages.

Figure 3A:
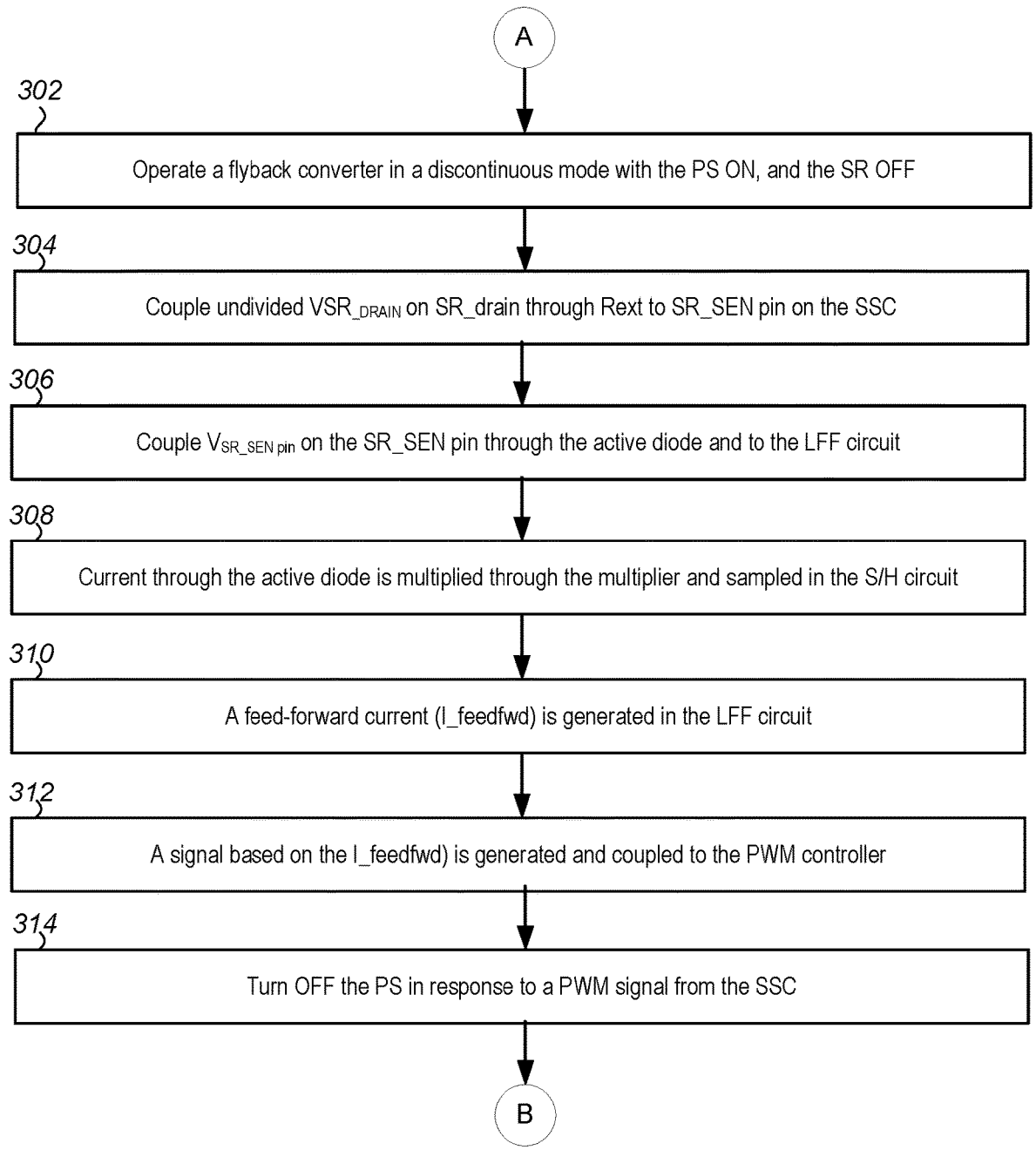
FIGS. 3A and 3B. illustrate a flowchart for a method of operating the SSC flyback converter shown in FIGS. 2A through 2D to provide accurate feed-forward sensing.
Figure 3B:
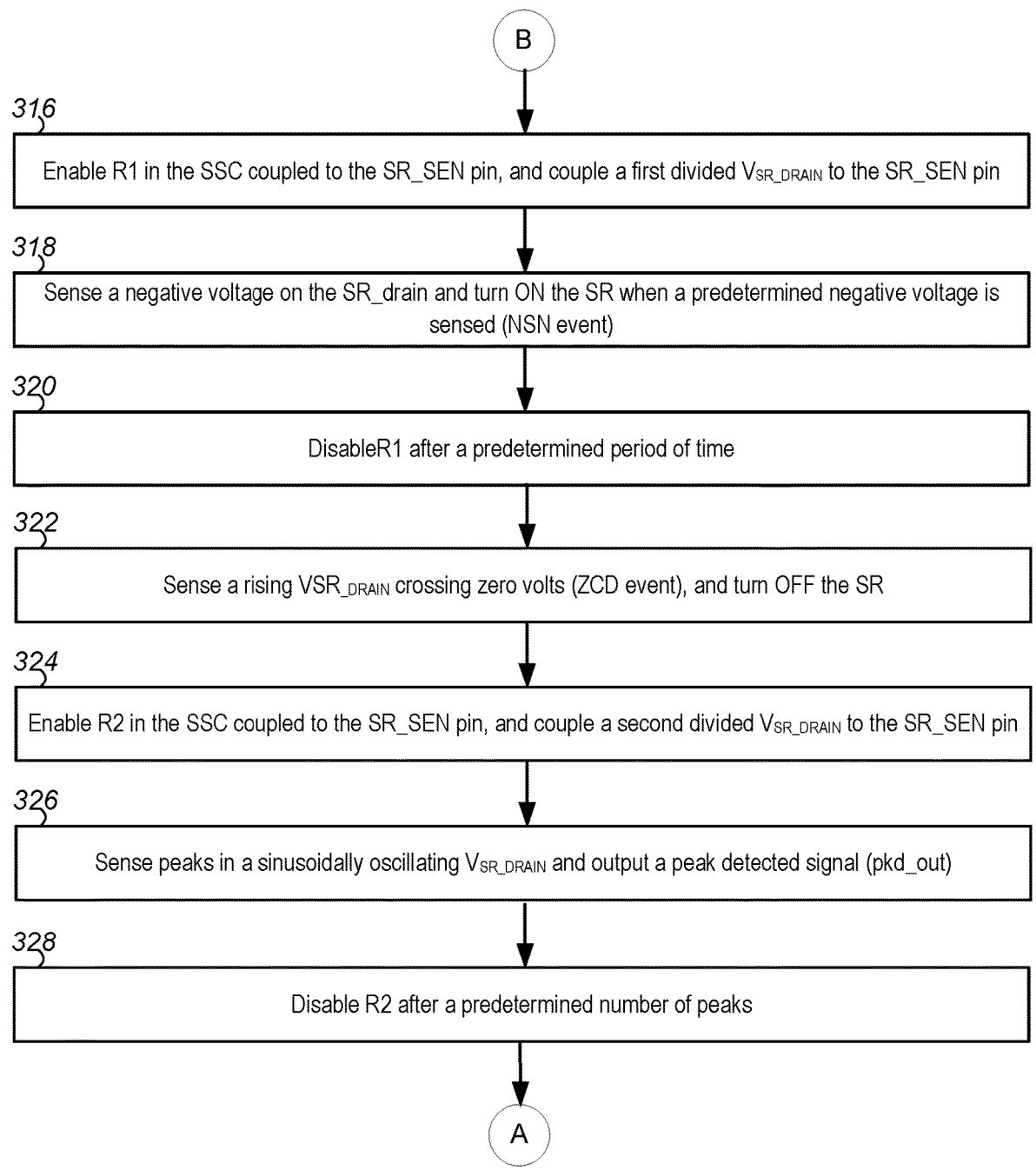

A method for operating a SSC flyback converter including a SR architecture to provide accurate feed-forward sensing, will now be described with reference to FIGS. 3A and 3B, and FIG. 4, where FIGS. 3A and 3B are a flowchart illustrating the method, and FIG. 4 graphically illustrates a voltage on a primary drain (PR_DRAIN) of a primary FET, a SR_drain voltage, a sample and hold (S/H) signal, a control negative sense (CTRLN) signal to switch in a first resistor for NSN threshold detection, and a control peak sense (CTRLP) signal to switch in another resistor for peak voltage detection.

Figure 4:
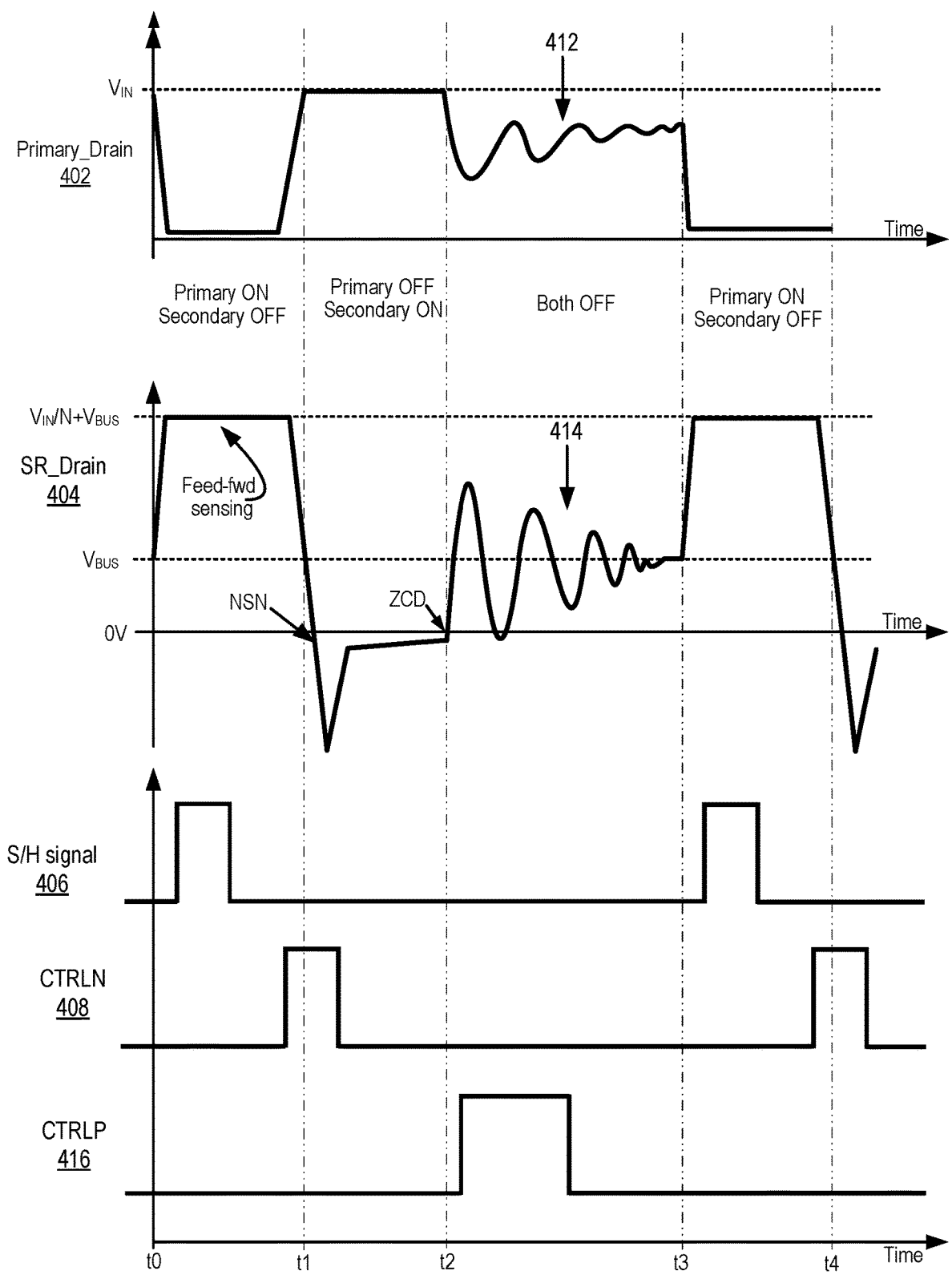
FIG. 4 graphically illustrates a voltage on a primary drain (PR_DRAIN) of a power switch (PS) in the primary of the SSC flyback converter of FIGS. 2A-2D, a voltage ($V_{SR\_DRAIN}$) on a drain of the SR, and signals to in the SSC to control circuits and components therein.

Referring to FIGS. 3A and 4 the method begins while operating the flyback converter in a discontinuous conduction mode (DCM) with the power switch (PS 216) in the primary-side 206 of the AC-DC converter 200 ON, and the SR 224 OFF (step 302). From time t0 to t1 as shown in FIG.

4, the PS 216 is on with the primary drain 402 coupled to through the PS and RCS to ground. The SR 224 is off with the SR_drain 224a having a voltage, $V_{SR\_DRAIN}$ 404 of:

$$V_{IN}/N + V_{BUS}$$

where $V_{IN}$ is line-input voltage, N is the turns-ratio of the transformer 204, and $V_{BUS}$ is secondary side output bus voltage.

At this time the flyback converter 200 is operated in feed-forward sensing mode, with switches S1 and S2 open so that an undivided $V_{SR\_DRAIN}$ is coupled through the external resistor Rext to the SR_SEN pin 226 (step 304). The voltage on the SR_SEN pin 226, $V_{SR\_SEN\_pin}$, which is substantially the same as the $V_{SR\_DRAIN}$, is then coupled through the PMOS diode 262 (or active clamp 284) to the LFF circuit 246 (step 306). As noted above, the PMOS diode 262 or active clamp 284 clamps the $V_{SR\_SEN\ pin}$ to a voltage less than $V_{BUS}$ and subtracts the $V_{BUS}$ component from the voltage sensed on the SR_drain. The resulting current through the PMOS diode 262 or active clamp 284, $I_D$, is then multiplied through multiplier N1, coupled to the S/H circuit 272 and the resulting multiplied $I_D$ sampled in response to a sample and hold signal (S/H signal 406) (step 308).

The sampled multiplied current is mirrored to the second NFET N2, a compensation current $I_{COMP}$ from the first current source 274 added, the resulting current checked against a reference current from the second current source 276 to P3 to detect an over-voltage or under-voltage condition of $V_{IN}$, and a feed-forward current (I_feedfwd) generated (step 310). Generally, this step further includes ensuring that the feed-forward current (I_feedfwd) is equal to or greater than a minimum feed-forward current. As noted above, the feed-forward current (I_feedfwd) generated is independent of internal resistance and variation in the SSC 202, and therefore is more accurate than in a conventional flyback converter 100. It is further noted that the feed-forward current (I_feedfwd) is generated without the need for a high-bandwidth voltage-to-current (V2I) circuit, and/or any extra circuit for $V_{BUS}$ component subtraction.

Next, a signal based on the feed-forward current (I_feedfwd) is generated and coupled to the PWM controller 238 to generate a PWM sawtooth signal, where the signal is compared with an error signal from the error amplifier 240 and the result coupled to the microcontroller 236 (step 312).

The microcontroller 236 generates a square-wave PWM signal, which is coupled through the pulse transformer driver 242 and the pulse transformer 258 to the PSC 218 to turn off the PS 216 (step 314) to control the duty cycle of the PS 216 to deliver desired power at the output VBUS. From time t1 the voltage on the drain of the PS 216 (Primary_drain 402) begins to rise to $V_{IN}$, while $V_{SR\_drain}$ 404 begins to fall.

Referring to FIGS. 3B and 4, switch S1 is closed by a CTRLN signal 408 from the RTL 256 in the microcontroller 236 enabling the voltage-divider formed by the external resistor Rext and resistor R1 of the internal resistor network 260 to substantially reduce the voltage on the SR_SEN pin 226 (step 316). Next, an NSN event is sensed on the SR_drain when $V_{SR\_drain}$ falls to or below a predetermined voltage, for example −700 millivolts (mV) to +200 mV, at which point the NSN block 248 signals the microcontroller 236 to turn on the SR 224 (step 318). Thereafter, the $V_{SR\_drain}$ begins to rise, rapidly at first as soon as SR_FET starts conducting the secondary current, then more gradually with decrease of secondary current. The CTRLN signal is removed after being applied for a brief, predetermined period of time causing the switch S1 to open and R1 to be disabled (step 320).

The undivided $V_{SR\_drain}$ coupled through the external resistor Rext to the SR_SEN pin is sensed by the ZCD block 250, and when a ZCD event is detected at a $V_{SR\_drain}$ of 0V, a zcd_out signal to the microcontroller 236 cause the SR 224 to be turned off (step 322). The capacitor (C2) in the snubber 214 and the primary-winding of the transformer 204 causes an LC resonance ringing 412 and a corresponding sinusoidal oscillation 414 in the $V_{SR\_Drain}$ on the SR_drain 224a. Switch S2 is closed by a CTRLP signal 416 from the RTL 256 in the microcontroller 236, enabling the voltage-divider formed by the external resistor Rext and resistor R2 of the internal resistor network 260 to substantially reduce the voltage on the SR_SEN pin 226 (step 324). The peaks in the sinusoidal oscillation 414 are sensed by the PKD block 252 and pkdet_out signals coupled to the microcontroller 236 (step 326). After a predetermined number of peaks, e.g., 3 to 4 peaks, have been detected the CTRLP signal is removed, causing the switch S2 to open and R2 to be disabled (step 328). After a second predetermined number of peaks, the microcontroller 236 causes a PWM signal to be generated and coupled through the 242 and 258 to the PSC 218 causing the PS 216 to be turned on, and method is repeated beginning with operating the flyback converter 200 in the DCM with feed-forward sensing (step 302).

Thus, a secondary-side-controlled AC-DC or flyback converter with a synchronous-rectifier (SR) sense architecture and method of operating the same for feed-forward accurate sensing have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A secondary side controller (SSC) for a flyback converter, the SSC comprising:
   a SR sense (SR_SEN) pin coupled through an external resistor (Rext) to a drain (SR_drain) of a synchronous rectifier (SR) on a secondary side of the flyback converter;

a negative-sensing-detector (NSN), a peak-detector (PKD), and a zero-crossing detector (ZCD) coupled to the SR_SEN pin; and a resistor network (Rn) coupled between the SR_SEN pin and ground, wherein the Rn comprises:
   a first resistor (R1) coupled to the SR_SEN pin and through a first switch (S1) to ground, the first switch controlled by a control negative sense (CTRLN) signal from an register transfer level (RTL) circuit in the SSC, the first switch operable to couple the R1 to ground based on an expected time of an NSN event to divide a SR_drain voltage ($V_{SR\_drain}$) coupled to the SR_SEN pin; and
   a second resistor (R2) having a resistance greater than the R1 coupled to the SR_SEN pin and through a second switch (S2) to ground, the second switch controlled by a control peak sense (CTRLP) signal from the RTL circuit, the second switch operable to couple the R2 to ground during peak detection to divide the $V_{SR\_drain}$ coupled to the SR_SEN pin, and to decouple the R2 after a pre-defined number of peaks have been detected.

2. The SSC of claim 1 further comprising a line-feed-forward (LFF) circuit coupled to the SR_SEN pin through an active diode, wherein the RTL circuit is operable to remove the CTRLN signal from S1 and CTRLP signal from S2 to decouple R1 and R2 from ground so that an undivided $V_{SR\_drain}$ is coupled through Rext to a voltage ($V_{SR\_SEN}$) on the SR_SEN pin during a feed-forward sensing mode of the flyback converter.

3. The SSC of claim 2 wherein the active diode is operable to remove from $V_{SR\_SEN}$ on the SR_SEN pin a component of $V_{SR\_Drain}$ arising from a output bus voltage ($V_{BUS}$) on an output of the secondary side of the flyback converter.

4. The SSC of claim 3 wherein the active diode is further operable to clamp the SR_SEN pin to $V_{BUS}$ when R1 and R2 are decoupled from ground.

5. The SSC of claim 4 wherein the active diode comprises a pair of drain extended p-type field effect transistors (DEPFETs) coupled at source terminals thereof and connected in series between the SR_SEN pin and the LFF circuit, the pair of DEPFETs operated using dynamic bulk switching provided by a third DEPFET with a drain terminal coupled to the SR_SEN pin and a source terminal coupled to a bulk terminal of the DEPFET coupled to the SR_SEN pin, and wherein gate terminals of all DEPEFETs are coupled to $V_{BUS}$.

6. The SSC of claim 2 wherein a diode current ($I_D$) through the active diode is mirrored by the LFF circuit and used for feed-forward sensing.

7. The SSC of claim 6 wherein the LFF circuit further comprises a sample and hold (S/H) circuit to sample and hold the $I_D$, and wherein the LFF circuit is operable to generate a feed-forward current (I_feedfwd) from the ID, and to extract information from the I_feedfwd on a line-in voltage ($V_{IN}$) applied to a primary side of the flyback converter, and to generate feed-forward (FF) signals used by the secondary side controller to control the flyback converter during feed-forward sensing mode.

8. The SSC of claim 7 wherein the LFF circuit further comprises a multiplier coupled between the active diode and the S/H circuit, the multiplier operable to multiply the Ip based on a turns-ratio (N) of a transformer in the flyback converter, to generate I_feedfwd that is independent of the transformer's turns-ratio.

9. The SSC of claim 8 wherein the LFF circuit further comprises a compensation current (I_COMP) source, and wherein the LFF circuit is further operable to add I_COMP to the sampled Ip to compensate for a diode voltage ($V_D$) dropped across the active diode.

10. The SSC of claim 9 wherein the LFF circuit is further operable to compare the I_feedfwd generated to a number of predefined current references and to detect over-voltage and under-voltage conditions of $V_{IN}$.

11. The SSC of claim 6 wherein the LFF circuit further comprises an internal clamping circuit I_feedfwd to a pre-determined value to provide a minimum I_feedfwd current for $V_{IN}$ lower than 80V.

12. A flyback converter comprising:
   a transformer including a primary winding coupled between a line-in voltage ($V_{IN}$) and through a power switch (PS) to ground, and a secondary winding coupled between an output bus voltage ($V_{BUS}$) and through a synchronous rectifier (SR) to ground; and
   secondary side controller (SSC) comprising:
      a SR sense (SR_SEN) pin coupled through an external resistor (Rext) to the secondary winding and a drain (SR_drain) of the SR;
      a negative-sensing-detector (NSN), a peak-detector (PKD), and a zero-crossing detector (ZCD) coupled to the SR_SEN pin; and
      a resistor network (Rn) coupled between the SR_SEN pin and ground, wherein the Rn comprises:
         a first resistor (R1) coupled to the SR_SEN pin and through a first switch (S1) to ground, the first switch controlled by a control negative sense (CTRLN) signal from an register transfer level (RTL) circuit in the SSC, the first switch operable to couple the R1 to ground based on an expected time of an NSN event to divide a SR_drain voltage ($V_{SR\_drain}$) coupled to the SR_SEN pin; and
         a second resistor (R2) having a resistance greater than the R1 coupled to the SR_SEN pin and through a second switch (S2) to ground, the second switch controlled by a control peak sense (CTRLP) signal from the RTL circuit, the second switch operable to couple the R2 to ground during peak detection to divide the $V_{SR\_drain}$ coupled to the SR_SEN pin, and to decouple the R2 after a pre-defined number of peaks have been detected.

13. The flyback converter of claim 12 wherein the SSC further comprises a line-feed-forward (LFF) circuit coupled to the SR_SEN pin through an active diode, wherein the RTL circuit is operable to remove the CTRLN signal from S1 and CTRLP signal from S2 to decouple R1 and R2 from ground so that an undivided $V_{SR\_drain}$ is coupled through Rext to a voltage ($V_{SR\_SEN}$) on the SR_SEN pin during a feed-forward sensing mode of the flyback converter.

14. The flyback converter of claim 13 wherein the active diode is operable to remove from $V_{SR\_SEN}$ on the SR_SEN pin a component of $V_{SR\_Drain}$ arising from $V_{BUS}$, and is further operable to clamp the SR_SEN pin to $V_{BUS}$ when R1 and R2 are decoupled from ground.

15. The flyback converter of claim 13 wherein the LFF circuit is operable to generate a feed-forward current (I_feedfwd) from a diode current ($I_D$) through the active diode, and to extract information from the I_feedfwd on $V_{IN}$ to generate feed-forward (FF) signals used by the SSC to control the flyback converter during feed-forward sensing mode.

16. A method of operating a secondary side controller for a flyback converter, the method comprising:
   coupling an undivided voltage ($V_{SR\_Drain}$) on a drain of a synchronous rectifier (SR) on a secondary side of a transformer in the flyback converter through an external resistor (Rext) to a synchronous rectifier sense (SR_SEN) pin of the secondary side controller, $V_{SR\_Drain}$ comprising a sum of a line-in voltage ($V_{IN}$) applied to a primary side of the transformer multiplied by a turns-ratio (N) of the transformer and a voltage ($V_{BUS}$) on an output bus coupled to the secondary side;

coupling a voltage ($V_{SR\_SEN}$) on the SR_SEN pin to a line feed forward (LFF) circuit through an active diode, the active diode operable to remove from the $V_{SR\_SEN}$ a component of $V_{SR\_Drain}$ arising from $V_{BUS}$;

in the LFF circuit, sampling and holding a diode current ($I_D$) through the active diode and generating a feed-forward current (I_feedfwd); and extracting information from the I_feedfwd on $V_{IN}$ and generating feed-forward (FF) signals used by the secondary side controller to control the flyback converter.

17. The method of claim 16 further comprising before sampling and holding $I_D$, multiplying ID using a multiplier based on the turns-ratio (N) of the transformer, to generate I_feedfwd that is independent of transformer's turns-ratio.

18. The method of claim 17 wherein generating I_feedfwd comprises adding a compensation current (I_COMP) to the sampled $I_D$ to compensate for a voltage drop (VD) across the active diode.

19. The method of claim 18 further comprising comparing the I_feedfwd generated against a number of predefined current references to detect over-voltage and under-voltage condition of $V_{IN}$.

20. The method of claim 19 wherein generating I_feedfwd comprises clamping I_feedfwd to a predetermined value to provide a minimum I_feedfwd current for $V_{IN}$ lower than 80V.

* * * * *